US009815708B2

(12) United States Patent
Savary

(10) Patent No.: US 9,815,708 B2
(45) Date of Patent: Nov. 14, 2017

(54) METHOD FOR PREPARING PARTICLES OF ALKALI METAL BICARBONATE

(71) Applicant: SOLVAY SA, Brussels (BE)

(72) Inventor: David Jean Lucien Savary, Dombasle-sur-Meurthe (FR)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 14/900,524

(22) PCT Filed: Jun. 26, 2014

(86) PCT No.: PCT/EP2014/063558
§ 371 (c)(1),
(2) Date: Dec. 21, 2015

(87) PCT Pub. No.: WO2014/207123
PCT Pub. Date: Dec. 31, 2014

(65) Prior Publication Data
US 2016/0130153 A1    May 12, 2016

(30) Foreign Application Priority Data
Jun. 26, 2013  (FR) ..................... 13 56160

(51) Int. Cl.
C01D 7/40     (2006.01)
C01D 7/00     (2006.01)
C01D 7/24     (2006.01)
C01D 7/10     (2006.01)

(52) U.S. Cl.
CPC ............... *C01D 7/40* (2013.01); *C01D 7/00* (2013.01); *C01D 7/10* (2013.01); *C01D 7/24* (2013.01); *C01P 2004/60* (2013.01); *C01P 2006/11* (2013.01)

(58) Field of Classification Search
CPC ........ C01D 7/40; B01D 9/005; B01D 9/0013; C01C 1/248
USPC ............................................. 23/300, 295 R
See application file for complete search history.

(56) References Cited

U.S. PATENT DOCUMENTS

| 2,642,342 A | 6/1953 | Vahl |
| 2,954,282 A | 9/1960 | Bauer et al. |
| 3,072,466 A | 1/1963 | Bauer et al. |
| 3,725,014 A | 4/1973 | Poncha et al. |
| 3,852,427 A | 12/1974 | Hoffman et al. |
| 3,855,397 A | 12/1974 | Hoffman et al. |
| 3,981,686 A | 9/1976 | Lobunez et al. |
| 4,478,599 A | 10/1984 | Puri et al. |
| 2001/0002243 A1 | 5/2001 | Shepard et al. |
| 2006/0150892 A1 | 7/2006 | Mayer |

FOREIGN PATENT DOCUMENTS

| CN | 1780671 A | 5/2006 |
| JP | 3097617 A2 | 4/1991 |
| JP | 4817160 B2 | 11/2011 |
| WO | WO 2011161120 A1 | 12/2011 |
| WO | WO 2013092650 A1 | 6/2013 |
| WO | WO 2013092754 A1 | 6/2013 |
| WO | WO 2014207120 A2 | 12/2014 |
| WO | WO 2014207124 A2 | 12/2014 |

OTHER PUBLICATIONS

Martinez-Cruz et al.—Effect of molecular weight of polystyrensulfonic acid sodium salt polymers on the precipitation kinetics of sodium bicarbonate (2004) Journal of Crystal Growth, vol. 270, No. 3-4 (9 pages).
Chemical Abstracts, Chemical Abstracts Service (1992) XP00318285—ISSN: 0009-2258 (1 page).
Shulan, et al—Study on crystallization kinetics of NaHCO3 in a new type of carbonation column and the effect of additive on the crystallization kinetics (1996) Journal of Beijing University of Chemical Technology, vol. 23, issue No. 3, Abstract (1 page).
Thieme, C.—Sodium Carbonates (2000) Ullmann's Encyclopedia of Industrial Chemistry, vol. 33, 299-317 (20 pages).
U.S. Appl. No. 14/900,514, Savary, filed Dec. 21, 2015.
U.S. Appl. No. 14/900,533, Savary, filed Dec. 21, 2015.
U.S. Appl. No. 13/805,005, Breton et al., filed Dec. 18, 2012.
U.S. Appl. No. 14/367,737, Piet et al., filed Jun. 20, 2014.
U.S. Appl. No. 14/365,121, Chau et al., filed Jun. 13, 2014.

*Primary Examiner* — Edward Johnson
(74) *Attorney, Agent, or Firm* — Beatrice C. Ortego

(57) ABSTRACT

A method for preparing particles of alkali metal bicarbonate by crystallization from a solution of alkali metal carbonate and/or bicarbonate in the presence of an additive in the solution, selected from the sulfates, sulfonates, the polysulfonates, the mines, the hydroxysultaines, the polycarboxylates, the polysaccharides, the polyethers and the etherphenols, alkali metal hexametaphosphate, the phosphates such as the organophosphates or the phosphonates, the sulfosuccinates, the amido-sulfonates, the aminosulfonates, preferably selected from: the phosphates, the organophosphates or the phosphonates, and such that the additive is present in the solution at a concentration of at least 1 ppm and preferably of at most 200 ppm.

21 Claims, No Drawings

METHOD FOR PREPARING PARTICLES OF ALKALI METAL BICARBONATE

CROSS-REFERENCE TO RELATED APPLICATIONS

The present application is a U.S. national stage entry under 35 U.S.C. §371 of International Application No. PCT/EP2014/063558 filed Jun. 26, 2014, which claims priority to French Application No. 13.56160 filed Jun. 26, 2013, the whole content of which being incorporated herein by reference for all purposes.

The present application claims priority of French patent application No. 1356160, filed on Jun. 26, 2013, the complete content of which being incorporated herein by reference for all purposes.

FIELD OF TECHNOLOGY

The invention relates to a method for preparing alkali bicarbonate particles and to the alkali bicarbonate particles obtainable by said method. The invention also relates to a method carried out for the purpose of controlling the bulk density of powders consisting of said particles, and/or carried out for the purpose of controlling the size of said particles.

PRIOR ART

The alkali metal bicarbonates, such as sodium bicarbonate ($NaHCO_3$) and potassium bicarbonate ($KHCO_3$), are products that have numerous properties, and are of interest in wide areas of use, extending from the pharmaceutical industry, to human and animal nutrition, passing through detergents, treatment of acid flue gases, and treatment of nonferrous metals.

The most common means for manufacturing these bicarbonates in the form of solid particles consists of crystallization of the bicarbonates by carbonation, with carbon dioxide, of a solution of carbonate of the corresponding alkali metal (sodium carbonate or potassium carbonate for example) or of a solution of hydroxide of the corresponding alkali metal (sodium hydroxide or potassium hydroxide for example). Generally these solutions are aqueous. However, water/alcohol solvent mixtures such as water/ethanol mixtures are also often used. The bicarbonates are often also crystallized by controlled cooling of solutions of bicarbonates, or by evaporation of such solutions.

Most of the uses of alkali bicarbonates in the form of particle powders require control of their bulk density (designated 'BD' in the present text). This control is important so as to be able to control the weight that can be put in given packaging (bags, big-bags, for example) or to control the weight loaded in bulk transport trucks that have fixed standard volumes. Moreover, the industrial users of such powders often have volumetric metering apparatus which has to be adjusted if the density of the powders delivered changes, and this causes loss of time if using different batches or batches from various production sites. It is therefore desirable to have a simple means in production of such bicarbonates for adjusting their BD.

Furthermore, the end users are interested in defined granulometric fractions that are optimized for their applications as a function of the required properties: for example dissolution rates, capacity for mixing with other powders homogeneously without segregation, flowability of the powders for ease of handling (measured for example by the Angle of repose, or by the flow rate through a calibrated orifice), etc.

It is therefore important to have a simple and effective means so as to be able to adjust the granulometric fraction of the bicarbonate particles manufactured.

In the existing methods, several parameters can be adjusted in order to control the density of the powders obtained as well as their granulometries. However, these two characteristics are not in a one-to-one relationship. In fact, the bulk density depends on several factors, among which we may mention: the size of the particles, the granulometric distributions (distributions by weight of the particles in different granulometric fractions, unimodal or multimodal distributions, wide or narrow granulometric distributions), the form factors of the particles (roundness, robustness, size of greatest concavity, surface concavity index), etc.

Once again it is useful to have a simple means in production of such bicarbonates, for adjusting the size of the particles and notably their oversize or undersize on sieves with different cutoff diameters.

SUMMARY OF THE INVENTION

The present invention relates to a method for preparing, by crystallization, alkali metal bicarbonate particles starting from a solution of alkali metal carbonate and/or bicarbonate (solution designated hereinafter: 'the solution') in the presence of an additive in the solution, characterized in that:
the additive is selected from the following compounds:
sulfates, in particular sodium sulfate and organosulfates;
sulfonates;
polysulfonates;
amines, in particular primary amines, cyclic amines, quaternary amines comprising at least one carboxylic acid group;
hydroxysultaines;
polycarboxylates;
polysaccharides;
polyethers and ether-phenols;
sulfosuccinates;
amidosulfonates;
aminosulfonates;
alkali metal hexametaphosphate in particular of sodium or potassium;
phosphates, in particular organophosphates, and phosphonates;
and the additive is present in the solution at a concentration of at least 1 ppm, advantageously at least 5 ppm, more advantageously at least 10 ppm.

The inventors in fact found, surprisingly, that the additives listed above, used during crystallization of the alkali metal bicarbonate particles, made it possible to obtain particles having a synergy between their granulometry, their form factor, or even their surface electric charge potentials, allowing either a large, adjustable increase in bulk density of the particles obtained, or a decrease in density. They also make it possible to modulate their granulometries, and their widening or narrowing of the granulometric distributions.

The invention also relates to the alkali metal bicarbonate particles thus obtained, and/or obtainable by the present method.

Definitions

In the present specification, selection of an element from a group of elements also describes explicitly:

selection of two or selection of several elements of the group, selection of an element from a subgroup of elements that consists of the group of elements from which one or more elements have been removed.

Moreover, it has to be understood that the elements and/or the characteristics of an apparatus, a method or a use, described in the present specification may be combined in all possible ways with the other elements and/or characteristics of the apparatus, method, or use, explicitly or implicitly, while remaining within the scope of the present specification, and must be considered as forming an integral part of the present specification.

In the passages of the present specification given below, different embodiments, or variants of the invention are defined in more detail. Each embodiment or variant thus defined may be combined with another embodiment, or with another variant, and this for each embodiment or variant unless stated otherwise or manifestly incompatible when the range of one and the same value parameter is unconnected. In particular, any variant indicated as being preferred or advantageous may be combined with another variant or with the other variants indicated as being preferred or advantageous.

In the present specification, the description of a range of values for a variable, defined by a lower limit, or an upper limit, or by a lower limit and an upper limit, also comprises the embodiments where the variable is selected respectively from the range of values: excluding the lower limit, or excluding the upper limit, or excluding the lower limit and the upper limit.

In the present specification, the description of several successive ranges of values for one and the same variable also comprises the description of embodiments where the variable is selected from any other intermediate range included in the successive ranges. Thus, for example when it is described that "the quantity X is generally above 10, advantageously above 15", the present description also describes the embodiment where: "the quantity X is above 11", or also the embodiment where: "the quantity X is above 13.74", etc.; 11 or 13.74 being values between 10 and 15.

The term "comprising" includes "consisting essentially of" as well as "consisting of".

In the present specification, the use of "a" or "one" in the singular, also comprises the plural ("some"), and vice versa, unless the context clearly indicates the opposite. As an example, "an additive" denotes one additive or more than one additive.

If the term "about" is used before a quantitative value, the latter corresponds to a variation of ±10% of the nominal quantitative value, unless stated otherwise.

The term "average" denotes a number average, unless stated otherwise.

The term "ppm" denotes parts per million expressed by weight (for example 1 ppm=1 mg per kilogram).

The term 'granulometric spread', or 'span', of a granulometric distribution of particles corresponds in the present specification to the following ratio: (D90-D10)/D50, the term D90 denoting the diameter for which 90 wt % of the particles have a size less than or equal to D90, the term D50 denoting the diameter for which 50 wt % of the particles have a size less than or equal to D50 (average size by weight), the term D10 denoting the diameter for which 10 wt % of the particles have a size less than or equal to D10.

DETAILED DESCRIPTION OF THE INVENTION

The present invention relates to a method for preparing, by crystallization, alkali metal bicarbonate particles starting from a solution of alkali metal carbonate and/or bicarbonate (solution called hereinafter: 'the solution') in the presence of an additive in the solution, for modifying:

the granulometric distribution of the particles, in particular the fraction of 'fine' particles under 125 µm, or the fraction of 'coarse' particles above 250 µm, or the 'granulometric spread' (or 'span')

or their BD, or their dissolution times, or their Angles of repose, or their flow rate, or their abrasion index.

In fact the inventors discovered that the various additives mentioned hereunder are modifiers of crystallization of the crystals of alkali metal bicarbonates that may be used in a small amount in a solution of alkali metal carbonate and/or bicarbonate, in which the crystals of alkali bicarbonate are crystallized.

In the present specification, 'alkali metal bicarbonate particles' means particles comprising at least 60%, advantageously at least 75%, more advantageously at least 85%, even more advantageously at least 90% or at least 95% or at least 99% of alkali metal bicarbonate. Generally in the present invention, the alkali metal bicarbonate particles comprise at most 40%, advantageously at most 25%, more advantageously at most 15%, even more advantageously at most 10% or at most 5% or at most 1% of alkali metal carbonate. In the present invention, the alkali metal particles may also contain small contents of ammonium bicarbonate, in general at most 2%, or at most 1% or at most 0.7% of ammonium bicarbonate. This is the case notably when the particles are crystallized in solutions containing ammonia, such as in the crystallization of sodium bicarbonate in the Solvay ammonia process, for manufacture of sodium carbonate. The alkali metal bicarbonate particles obtained in this method are generally denoted by the expression 'crude bicarbonate' (cf. Ullmann's Encyclopedia of Industrial Chemistry, 2012, Wiley-VCH Verlag GmbH & Co, Weinheim, "Sodium carbonate", Vol. 33 page 307).

In the present invention, the alkali metal bicarbonate may be bicarbonate of: lithium, sodium, potassium, rubidium or cesium. Advantageously the alkali metal bicarbonate is sodium bicarbonate or sodium bicarbonate. More advantageously the alkali metal bicarbonate is sodium bicarbonate. In particular, in the present invention, the alkali metal bicarbonate particles are advantageously particles comprising at least 99% of sodium bicarbonate and less than 1% of sodium carbonate or water.

The present invention is based on the discovery of the effects of the additives mentioned in the present specification, for which the different variants of the method and/or of the product obtained by said variants of the method are described in more detail below.

Item 1. Method for preparing, by crystallization, alkali metal bicarbonate particles starting from a solution of alkali metal carbonate and/or bicarbonate (solution designated hereunder: 'the solution') in the presence of an additive in the solution, characterized in that:

the additive is selected from the following compounds:

sulfates, in particular sodium sulfate and organosulfates;

sulfonates;

polysulfonates;

amines, in particular primary amines, cyclic amines, quaternary amines comprising at least one carboxylic acid group;

hydroxysultaines;

polycarboxylates;

polysaccharides;
polyethers and ether-phenols;
sulfosuccinates;
amidosulfonates;
aminosulfonates;
alkali metal hexametaphosphate in particular of sodium or of potassium;
phosphates, in particular organophosphates, and phosphonates;
and the additive is present in the solution at a concentration of at least 1 ppm, advantageously of at least 5 ppm, more advantageously of at least 10 ppm.

Item 2. Method according to item 1, in which the additive is an organosulfate and is selected from the following compounds:
alkyl sulfates comprising from 4 to 20 carbons, preferably from 8 to 16 carbons, or from 8 to 14 carbons such as lauryl sulfate (dodecyl sulfate),
alkyl ether sulfates (such as Rhodapex ESB-70/A2);

Item 3. Method according to item 1, in which the additive is a sulfonate and is selected from the following compounds:
alkyl sulfonates;
alkylbenzene sulfonates or alkylnaphthalene sulfonates; in particular disodium dodecyl (sulfonatophenoxy) benzene-sulfonate (CAS 28519-02-0, such as Rhodacal DSB), disodium 2,2'(or 3,3')-oxybis[5(or 2)-dodecyl-benzenesulfonate (CAS 25167-32-2), sodium alkyl naphthalene sulfonate (such as Rhodacal BX-78), isopropylamine dodecylbenzene sulfonate (such as Rhodacal 330);
polysulfonates, in particular polyvinylsulfonic acid and alkali metal salts thereof;
aminosulfonates in particular: N-methyltaurine, sodium N-methyltaurinate, isopropylamine dodecylbenzene sulfonate;
amidosulfonates in particular those with more than 6 carbons, in particular: sodium 2-[methyloleoylamino]ethane-1-sulfonate (such as Geropon T/77);
sulfosuccinates in particular sodium docusate (such as Geropon SDS, Aerosol OT, Constonate, Diomedicone, Clestol, Complemix, Defilin, Dioctlyn, Dioctylal, Diosuccin);

Item 4. Method according to item 1, in which the additive is an amine, and is selected from the following compounds:
primary amines, in particular hexamethylenediamine;
quaternary amines comprising at least one carboxylic acid group, in particular the quaternary amines of formula: $(H_3C)_3$—N—R—COOH with R=$(CH_2)_n$ and n=1 to 4, in particular trimethylglycine (or betaine);
quaternary amines comprising at least one sulfonate group, in particular hydroxysultaines, such as cocamidopropyl hydroxysultaine (such as Mirataine CBS);
cyclic amines (such as Miranol DM);

Item 5. Method according to item 1, in which the additive is a polycarboxylate, and is preferably selected from the following compounds: polyacrylates, in particular crosslinked polyacrylates, or copolymers of acrylic and maleic acids, or of sodium prop-2-enoate (such as: Polyco, Rhotex GS, Acrysol 1 mw-45N, Hiviswako 105); in particular polyacrylates or acrylic and maleic copolymers, or alkali metal salts thereof, of average molecular weight below 8000 g/mol, or greater than or equal to 8000 g/mol;

Item 6. Method according to item 1, in which the additive is a polysaccharide, and is preferably selected from the following compounds:
guar gums and their derivatives, in particular hydroxypropylguar (such as Jaguar HP-105);
alginic acid and its salts such as of sodium or of calcium or of copper (such as: Kaltostat, Calginat, Landalgine, Kalrostat, Kelacid, Vocoloid, Xantalgin);
carboxymethylcellulose (such as Aquaplast, Carmethose, Cellofas, Cellpro, Cellugel, Collowel, Ethoxose, Orabase, Lovosa);

Item 7. Method according to item 1, in which the additive is a polyether or an ether-phenol or a polyaromatic ester, and is preferably selected from the following compounds:
polyethylene glycol mono(tristyrylphenyl)ether;
ethoxylated oleyl alcohols (such as Rhodasurf ON/870-E);
branched octylphenoxy poly(ethyleneoxy)ethanols (such as Igepal CA630);
ethoxylated polyarylphenols, in particular ethoxylated tristyrylphenol (such as Soprophor CY/8);

Item 8. Method according to item 1, in which the additive is a sulfosuccinate, and is preferably selected from the following compounds:
sulfosuccinates, in particular: sodium docusate (such as Aerosol OT, Constonate, Diomedicone, Clestol, Complemix, Defilin, Dioctlyn, Dioctylal, Diosuccin);

Item 9. Method according to item 1, in which the additive is an organophosphate or a phosphonate, and is preferably selected from the following compounds:
polyoxyethylene alkylether phosphates, whose alkyl chain advantageously comprises from 6 to 20 carbons, in particular polyoxyethylene octadecenyl ether phosphate (such as Lubrophos LB/400-E);
poly(oxy-1,2-ethanediyl),.alpha.-(dinonylphenyl)-omega-hydroxy-phosphate (such as RHODAFAC RM-510);
alkyl-phosphonic or hydroxyalkyl-phosphonic acids of semi-structural formula $((HO)_2OP)$—R with R an alkyl group, or hydroxyalkyl group, in particular with R an alkyl group with 1 to 3 carbons, or R a hydroxyalkyl group comprising 1 to 3 carbons and 1 to 2 hydroxyl (—OH) groups, or salts thereof in particular of alkali metal such as sodium or potassium;
alkyl-diphosphonic acids, in particular those of semi-structural formula $((HO)_2OP)$—R—$(PO(OH)_2)$ and with R an alkyl group, or a hydroxyalkyl group, in particular with R an alkyl group with 1 to 3 carbons, or R a hydroxyalkyl group comprising 1 to 3 carbons and 1 to 2 hydroxyl (—OH) groups (such as etidronic acid $((HO)_2OP)$—$C(CH_3)OH$—$(PO(OH)_2)$), or salts thereof in particular of alkali metal such as sodium or potassium;
nitrilo-alkyl-phosphonic acids of semi-structural formula $((HO)_2OP$—$R)_3$—N with R an alkyl chain with 1 to 5 carbons, or salts thereof in particular of alkali metal such as sodium or potassium, in particular nitrilo-tri-(methanephosphonic) acid or salts thereof in particular of alkali metal such as sodium or potassium.

Item 10. Method according to any one of items 1 to 9, in which the additive is present at a concentration of at most 200 ppm, advantageously of at most 100 ppm, more advantageously of at most 70 ppm.

Item 11. Method according to any one of items 1 to 10, in which crystallization of alkali metal bicarbonate particles is carried out by cooling the solution.

Item 12. Method according to item 11, in which cooling of the solution is carried out between 70° and 30° C.

Item 13. Method according to any one of items 1 to 12, in which crystallization of alkali metal bicarbonate particles is carried out by carbonation of the solution with carbon dioxide.

Item 14. Method according to item 13, in which carbonation of the solution is carried out at a temperature of at least 20° C., advantageously at least 30° C., and preferably of at most 95° C., more preferably of at most 90° C.

Item 15. Method according to any one of items 1 to 14, in which crystallization of alkali metal bicarbonate particles is carried out by evaporation of at least a proportion of the solution.

Item 16. Method according to any one of items 1 to 15, in which crystallization of alkali metal bicarbonate particles is carried out by concomitant cooling and carbonation of the solution; or by concomitant cooling and carbonation and evaporation of the solution.

Item 17. Method according to any one of items 13, 14 or 16, in which carbonation of the solution with carbon dioxide is carried out with a gas comprising: 10 to 100% of $CO_2$ by volume based on dry gas, advantageously at least 20% of $CO_2$ by volume based on dry gas, more advantageously at least 30% of $CO_2$ by volume based on dry gas, even more advantageously at least 35% of $CO_2$ by volume based on dry gas.

Item 18. Method according to any one of items 1 to 17 carried out at a temperature between 20° C. and 95° C., preferably between 30 and 90° C.

Item 19. Method according to any one of items 1 to 18, in which addition of the additive is carried out for controlling or modifying:
the granulometry (such as D10, D50, D90 or the span), or
the undersize or oversize on a sieve at 125 μm, or
the undersize or oversize on a sieve at 250 μm.
of the alkali metal bicarbonate particles obtained after separation of the crystallization solution and of the alkali bicarbonate particles.

Item 20. Method according to any one of items 1 to 19, in which addition of the additive is carried out for controlling or modifying:
the dissolution time, or
the bulk density (BD), or
the flow rate in a calibrated orifice,
the abrasion index,
of the alkali metal bicarbonate particles obtained after separation of the crystallization solution and of the alkali bicarbonate particles, then drying of the alkali metal bicarbonate particles.

Item 21. Method according to item 20 according to which addition of the additive makes it possible to increase the BD, and the increase in the BD of the alkali metal bicarbonate particles is at least 10%, or at least 20%, or at least 30%, or at least 40%, or at least 50%, or at least 60%, or at least 70%, or at least 80%, or at least 90%, or at least 100% relative to the BD of alkali metal bicarbonate particles obtained in the same conditions of crystallization but without addition of additive.

Item 22. Method according to item 21 according to which addition of the additive makes it possible to reduce the BD, and the reduction of the BD of the alkali metal bicarbonate particles is at least 10%, or at least 15% relative to the BD of alkali metal bicarbonate particles obtained in the same conditions of crystallization but without addition of additive.

Item 23. Method according to item 19 carried out for controlling the size of the alkali bicarbonate particles, in particular for controlling the sieve undersize at 125 μm or sieve oversize at 250 μm of the alkali bicarbonate particles.

Item 24. Method according to any one of items 19 to 21, in which addition of additive makes it possible to:
increase the granulometry (such as D10, D50, D90) or reduce the span, or
reduce the sieve undersize at 125 μm, or
increase the sieve oversize at 250 μm, or
reduce the dissolution time, or
increase the bulk density (BD), or
reduce the abrasion index,
of the alkali metal bicarbonate particles relative to one and the same preparation that would be performed without additive, and in said method the additive is selected from the additives listed in item 6 (the polysaccharides), in particular alginic acid or carboxymethylcellulose.

Item 25. Method according to item 24, in which crystallization of the alkali bicarbonate particles is carried out by cooling and/or by carbonation.

Item 26. Method according to any one of items 19 to 21, in which addition of additive makes it possible to:
increase the granulometry (such as D10, D50, D90) or reduce the span, or
reduce the sieve undersize at 125 μm, or
increase the sieve oversize at 250 μm, or
reduce the dissolution time, or
increase the bulk density (BD), or
reduce the abrasion index,
of the alkali metal bicarbonate particles relative to one and the same preparation effected without additive, and in which said method the additive is selected from the additives listed in item 5 (polycarboxylates) and selected from: polyacrylates, in particular crosslinked, or acrylic and maleic acid copolymers or alkali metal salts thereof, of average molecular weight greater than or equal to 8000 g/mol.

Item 27. Method according to any one of items 19, 20 or 22, in which addition of additive makes it possible to:
reduce the granulometry (such as D10, D50, D90) or increase the span, or
increase the sieve undersize at 125 μm, or
reduce the sieve oversize at 250 μm, or
reduce the dissolution time, or
reduce the bulk density (BD), or
increase the abrasion index,
of the alkali metal bicarbonate particles relative to one and the same preparation effected without additive, and in which said method the additive is selected from the additives listed in item 5 (polycarboxylates) and selected from: polyacrylates, in particular crosslinked, or acrylic and maleic acid copolymers or alkali metal salts thereof, of average molecular weight below 8000 g/mol.

Item 28. Method according to item 26 or 27, in which crystallization of the alkali bicarbonate particles is carried out by cooling and/or by carbonation.

Item 29. Method according to any one of items 19, or 22, in which addition of additive makes it possible to:
reduce the granulometry (such as D10, D50, D90) or increase the span, or
increase the sieve undersize at 125 μm, or
reduce the sieve oversize at 250 μm, or
reduce the dissolution time, or
reduce the bulk density (BD), or
increase the abrasion index,
of the alkali metal bicarbonate particles relative to one and the same preparation effected without additive, and in which said method the additive is selected from the additives listed in item 9 (an organophosphate or a phosphonate).

Item 30. Method according to item 29, in which crystallization of the alkali bicarbonate particles is carried out by cooling and/or by carbonation.

Item 31. Alkali metal bicarbonate particles obtainable by the method according to any one of items 1 to 30 and comprising at least 10 ppm, advantageously at least 20 ppm of the additive.

The additives are used in the present invention, in general, at a concentration in the solution of at least 1 ppm, advantageously at least 5 ppm, more advantageously at least 10 ppm.

The amounts in ppm (parts per million) are expressed by weight and correspond to the amount of additive introduced into the solution if crystallization is effected in a batch (discontinuous) process or corresponds to the proportion of additive introduced relative to the solution fed into the crystallization apparatus if crystallization is carried out continuously. They correspond to the mg of active substance of additive per kg of solution.

A low concentration of these additives is sufficient to have a remarkable effect on the bicarbonate particles obtained. However, a concentration of additives that is too high adversely affects the purity of the alkali metal bicarbonates. In the present invention the additive is present at a concentration of at most 200 ppm, advantageously of at most 100 ppm, more advantageously of at most 70 ppm, even more advantageously of at most 50 ppm.

Amounts of about (i.e. ±10%) of: 10 ppm, or 20 ppm, or 50 ppm of additive in the solution are particularly advantageous.

However, the amounts of additives may be adjusted in order to adjust the desired value of the parameter, for example BD, or the parameter of the granulometric sieve oversize, in particular at 125 μm or at 250 μm.

The solution of alkali metal carbonate and/or bicarbonate is preferably an aqueous solution comprising from 1 to 30 wt % of alkali metal carbonate and/or comprising 1 to 18 wt % of alkali metal bicarbonate.

Crystallization of the particles according to the invention may be done with seeding or without seeding of crystals of alkali metal bicarbonate.

In a preferred embodiment according to the invention, the solution is seeded. In the case of batch crystallization with seeding, an amount of seeding of the order of 0.1 to 10% of bicarbonate crystals is introduced before the start of crystallization of the bicarbonate particles according to the invention. In the case of crystallization carried out continuously, the suspension density of the bicarbonate crystals executing production in the crystallization apparatus constitutes the seeding itself. In this case, suspension densities of alkali metal bicarbonate particles relative to the weight of the suspension of particles in the crystallization mother liquor are generally from 0.1 to 25 wt %.

In a first embodiment according to the invention, crystallization of alkali metal bicarbonate particles is carried out by cooling the solution.

In a second embodiment according to the invention, crystallization of alkali metal bicarbonate particles is carried out by carbonation of the solution with carbon dioxide.

In a third embodiment according to the invention, crystallization of alkali metal bicarbonate particles is carried out by evaporation of at least a portion of the solution.

Each of the three embodiments mentioned above may be combined in the present invention. In particular, in a fourth embodiment according to the invention, crystallization of alkali metal bicarbonate particles is carried out by concomitant cooling and carbonation of the solution; or by concomitant cooling and carbonation and evaporation of the solution. In the case when crystallization is effected by carbonation with a gas comprising carbon dioxide, injection of the gas might not be saturated by the solvent of the solution at the temperature of the suspension of the crystallizing particles. In this case, injection of the gas is accompanied by partial evaporation of the solvent of the solution. This also causes cooling of the solution.

In each of the above embodiments, it is preferred in the present invention when at least two liquid and gaseous phases are present during preparation of particles by crystallization, when the continuous phase is the liquid phase and when the gas phase is a dispersed phase in the liquid phase.

In each of the above embodiments when there is carbonation of the solution, carbonation of the solution with carbon dioxide is carried out with a gas generally comprising: 10 to 100% of $CO_2$ by volume based on dry gas, advantageously at least 20% of $CO_2$ by volume based on dry gas, more advantageously at least 30% of $CO_2$ by volume based on dry gas, even more advantageously at least 35% of $CO_2$ by volume based on dry gas In the present invention, preparation of alkali metal bicarbonate particles by crystallization is generally carried out at a temperature between 20° C. and 95° C. It is advantageous for the temperature to be at least 30° C. It is also advantageous for the temperature to be at most 90° C.

The bulk density of the alkali metal bicarbonate particles is measured by the following procedure: the particles are put in a smooth steel hopper of truncated shape (top diameter 53 mm, bottom diameter 21 mm, height 58 mm) closed at the bottom by a closing device consisting of a horizontal sheet of smooth steel. Then the bottom of the hopper is opened by removing the closing device, and the particles are collected in a 50 $cm^3$ cylinder (inside diameter 37 mm, height 46 mm) situated (its top) less than 5 cm under the closing device. Then the excess of particles projecting above the cylinder is leveled, without tamping the powder, and checking that the whole cylinder is filled with powder to the brim, the weight of the powder contained in the 50 $cm^3$ is weighed and the ("free") bulk density of the powder is expressed as the apparent weight of the powder referred to the volume of 50 $cm^3$, expressed in kg/liter or $kg/m^3$.

The following examples are given to illustrate certain embodiments of the present invention. They are not limiting in any case.

EXAMPLES

Example 1—Crystallization of Sodium Bicarbonate Particles by Cooling—Control of the Free Bulk Density Equipment used: 500-ml double-jacket beakers, stirred by a magnetic bar at 350 rev/min. Büchner filter and laboratory vacuum pump.

Operating Conditions:

TABLE 1

Operating conditions of the tests.

| Initial aqueous solution Concentrations | | | | |
|---|---|---|---|---|
| [$NaHCO_3$] required g/kg | [$Na_2CO_3$] required g/kg | Seeding Type — | Amount g | Stirring speed rev/min |
| 117 | 70 | BICAR 200-250 μm | 1 | 350 |

The "BICAR" used as seed is a sodium bicarbonate of brand "BICAR® Codex" of Pharmacopeia quality, from the SOLVAY company sieved between 200 and 250 μm.

TABLE 2

Operating conditions of the tests (continued).

| Temperature | | | |
|---|---|---|---|
| Initial °C. | Rate of decrease °C./h | Final °C. | Maturation time at 30° C. min |
| 70 | 40 | 30 | 30 |

At the end of the step of crystallization by cooling, the suspension of bicarbonate particles is filtered on a Büchner and washed with 50 ml of ethanol saturated with sodium bicarbonate, to remove most of the crystallization mother liquor. The particles are then dried in open air overnight. The agglomerates due to drying are broken up on a stainless steel plate with a rubber stopper with light hand pressure, and the powder obtained is then sieved at 500 µm.

Results of the Reference Tests without Additive

TABLE 3

BD of the particle powders without additive.

| Test | Additive | BD g/L |
|---|---|---|
| 12-2 | No additive | 403 |
| 12-3 | No additive | 422 |
| 12-4 | No additive | 425 |
| 12-5 | No additive | 423 |
| 12-6 | No additive | 452 |
| 22-1 | No additive | 436 |
| 22-2 | No additive | 426 |
| 22-3 | No additive | 439 |
| 22-4 | No additive | 412 |
| 22-5 | No additive | 420 |
| 22-6 | No additive | 443 |
| | MEAN BD | 427 |
| | STANDARD DEVIATION | 14 |
| | CV | 3% |

The following table (Table 4.a) only gives the additives for which the BD is greater than the mean BD of the reference tests+3 standard deviations (i.e. >470 kg/m$^3$). Moreover, the ratio BD add/BD ref is the ratio of the BD of the sodium bicarbonate crystallized in the presence of additive divided by the mean BD of the sodium bicarbonate crystallized without additive (i.e. 427 kg/m$^3$):

TABLE 4.a

BD of the particle powders with additive and comparison with and without additive.

| Test | Additive | [Additive] mg/kg | BD g/L | BD add/ BD ref — |
|---|---|---|---|---|
| 13-3 | Betaine | 20 | 483 | 1.1 |
| 24-6 | Mirataine CBS | 20 | 486 | 1.1 |
| 31-5 | Rhodacal DSB | 20 | 486 | 1.1 |
| 31-2 | Rhodacal DSB | 20 | 488 | 1.1 |
| 15-4 | Polyvinysulfonic acid | 20 | 489 | 1.1 |
| 19-5 | Sodium polyacrylate | 20 | 492 | 1.2 |
| 16-1 | Alginic acid | 20 | 498 | 1.2 |
| 13-4 | Carboxymethylcellulose | 20 | 501 | 1.2 |
| 15-6 | Polyvinysulfonic acid | 20 | 502 | 1.2 |
| 19-2 | Sodium polyacrylate | 20 | 504 | 1.2 |
| 27-2 | Soprophor CY/8 | 20 | 506 | 1.2 |
| 16-3 | Alginic acid | 20 | 513 | 1.2 |
| 19-1 | Soybean lecithin | 20 | 525 | 1.2 |
| 37-5 | Rhodacal BX-78 | 20 | 529 | 1.2 |
| 37-2 | Rhodacal BX-78 | 20 | 532 | 1.2 |
| 40-2 | Sodium hexametaphosphate | 20 | 539 | 1.3 |
| 26-5 | Geropon SDS | 20 | 542 | 1.3 |
| 37-4 | Rhodacal 330 | 20 | 552 | 1.3 |
| 19-3 | Soybean lecithin | 20 | 552 | 1.3 |
| 26-2 | Geropon SDS | 20 | 559 | 1.3 |
| 35-2 | Rhodacal DSB | 50 | 568 | 1.3 |
| 40-4 | Rhodacal BX-78 | 50 | 571 | 1.3 |
| 42-3 | Sodium hexametaphosphate | 20 | 574 | 1.3 |
| 37-6 | Rhodacal 330 | 20 | 575 | 1.3 |
| 40-6 | Rhodacal BX-78 | 50 | 576 | 1.3 |
| 42-6 | Sodium hexametaphosphate | 20 | 577 | 1.4 |
| 42-5 | Sodium hexametaphosphate | 20 | 578 | 1.4 |
| 19-6 | Sodium hexametaphosphate | 20 | 587 | 1.4 |
| 40-1 | Sodium hexametaphosphate | 20 | 592 | 1.4 |
| 35-5 | Rhodacal DSB | 50 | 596 | 1.4 |
| 42-1 | Sodium hexametaphosphate | 20 | 598 | 1.4 |
| 19-4 | Sodium hexametaphosphate | 20 | 600 | 1.4 |
| 40-3 | Sodium hexametaphosphate | 20 | 603 | 1.4 |
| 26-4 | Geropon T/77 | 20 | 609 | 1.4 |
| 42-4 | Sodium hexametaphosphate | 20 | 624 | 1.5 |
| 18-2 | Polyvinysulfonic acid | 50 | 640 | 1.5 |
| 41-4 | Rhodacal 330 | 50 | 640 | 1.5 |
| 26-6 | Geropon T/77 | 20 | 644 | 1.5 |
| 18-5 | Polyvinysulfonic acid | 50 | 646 | 1.5 |
| 41-6 | Rhodacal 330 | 50 | 664 | 1.6 |
| 21-4 | Polyvinysulfonic acid | 50 | 666 | 1.6 |
| 18-1 | Sodium dodecyl sulfate | 10 | 686 | 1.6 |
| 21-6 | Polyvinysulfonic acid | 50 | 692 | 1.6 |
| 18-4 | Sodium dodecyl sulfate | 50 | 722 | 1.7 |
| 14-4 | Sodium dodecyl sulfate | 20 | 759 | 1.8 |
| 18-3 | Sodium dodecyl sulfate | 10 | 765 | 1.8 |
| 18-6 | Sodium dodecyl sulfate | 50 | 810 | 1.9 |
| 14-6 | Sodium dodecyl sulfate | 20 | 839 | 2.0 |

TABLE 4.b

BD (kg/m$^3$) of the particle powders obtained with additives of the polyacrylate type of different molecular weights (average molecular weights). BD (kg/m$^3$) - Function of the molecular weight of the sodium polyacrylate and the amount of additive added

| Molecular weight of Na polyacrylate (g/mol) | 10 ppm | 20 ppm | 30 ppm | 50 ppm |
|---|---|---|---|---|
| 1800 | 322 | 296 | 300 | 273 |
| 2100 | 367 | 345 | — | 268 |
| 8000 | 464 | 504 | 560 | 630 |
| 14800 | 458 | 582 | 644 | 898 |
| 1250000 | 442 | 477 | 553 | 697 |

Remarks:

For 10 ppm of additive (ppm=mg active substance/kg initial liquid):

$600<BD<700$ kg/m$^3$ (factor 1.4 to 2.0) using sodium dodecyl sulfate

For 20 ppm of additive (ppm=mg active substance/kg initial liquid):

$470<BD<600$ kg/m$^3$:
  Betaine
  Mirataine CBS
  Rhodacal DSB
  Polyvinylsulfonic acid
  Sodium polyacrylate of average molecular weight 8000 g/mol
  Alginic acid
  Carboxymethylcellulose
  Soprophor CY/8
  Rhodacal BX-78
  Sodium hexametaphosphate
  Geropon SDS
  Rhodacal 330
  Soybean lecithin
  Geropon T/77

$600<BD<700$ kg/m$^3$:
  Geropon T/77
  Sodium hexametaphosphate.

$BD>700$ kg/m$^3$:
  Sodium dodecyl sulfate.

For 50 ppm of additive (ppm=mg active substance/kg initial liquid):

$470<BD<600$ kg/m$^3$ using Rhodacal DSB, Rhodacal BX-78

$630<BD<898$ kg/m$^3$ using sodium polyacrylate of average molecular weight at least 8000 g/mol $600<BD<700$ kg/m$^3$ using polyvinylsulfonic acid, Rhodacal 330

$BD>700$ kg/m$^3$ using sodium dodecyl sulfate.

The following table (Table 4.c) only gives the additives for which BD is below the mean BD of the reference tests minus 1.4 standard deviations (i.e. ≤407 q/L).

TABLE 4.c

BD of the particle powders with additive (organophosphates and phosphonates) and comparison with and without additive.

| Test | Additive | [Additive] mg/kg | BD g/L | BD add/ BD ref |
|---|---|---|---|---|
| | Lubrophos LB/400-E | 20 | 404 | 0.95 |
| | Rhodafac RM 510 | 20 | 407 | 0.95 |
| | Nitrile-tri-(methane-phosphonic) acid | 20 | 380 | 0.89 |
| | Etidronic acid | 20 | 369 | 0.86 |

Comments for the organophosphates and phosphonates:

For 20 ppm of additive (ppm=mg active substance/kg initial liquid):

$369<BD<407$ kg/m$^3$ (factor 0.86 to 0.95) using organophosphates or phosphonates; i.e. decreases by 5 to 14% of BD relative to the reference BD.

Example 2—Crystallization of Sodium Bicarbonate Particles by Cooling—Control of the Sieve Oversize Equipment and operating conditions: same as in example 1 (cf. notably Tables 1 and 2).

Results of the reference tests without additive:

TABLE 5

Results of the reference tests without additive - Oversize on vibratory sieve for particle powders.

| Test | Additive | Fraction < 125 μm (wt %) | 125 < F < 250 μm (wt %) | F > 250 μm (wt %) |
|---|---|---|---|---|
| 12-1 | No additive | 21 | 64 | 14 |
| 12-2 | No additive | 22 | 62 | 16 |
| 12-3 | No additive | 28 | 61 | 11 |
| 12-4 | No additive | 23 | 53 | 24 |
| 12-5 | No additive | 27 | 62 | 11 |
| 12-6 | No additive | 31 | 58 | 11 |
| 22-1 | No additive | 26 | 57 | 17 |
| 22-2 | No additive | 25 | 59 | 16 |
| 22-3 | No additive | 32 | 55 | 12 |
| 22-4 | No additive | 18 | 60 | 22 |
| 22-5 | No additive | 29 | 59 | 13 |
| | MEAN | 26 | 59 | 15 |
| | STANDARD DEVIATION | 4 | 3 | 5 |
| | Coef. of Variation | 17% | 5% | 31% |

Results of the Tests with Additives:

The following table (Table 6) only gives the additives for which the undersize at 125 μm is greater than 38 wt % (>mean value of the reference tests without additive+3 standard deviations). Moreover, the ratio F add/F ref is the ratio of the undersize fraction by weight at 125 μm of sodium bicarbonate crystallized in the presence of additive divided by the average undersize fraction by weight at 125 μm of sodium bicarbonate crystallized without additive (i.e. 26 wt %):

TABLE 6

Results of the tests with additives - undersize on vibratory sieve for particle powders.

| Test | Additive | [Additive] mg/kg | F < 125 μm wt % | F add/ F ref |
|---|---|---|---|---|
| 30-5 | Lubrophos LB/400-E | 20 | 65 | 2.5 |
| 41-6 | Rhodacal 330 | 50 | 62 | 2.4 |
| 28-6 | Rhodafac RM 510 | 20 | 53 | 2.1 |
| 35-3 | Lubrophos LB/400-E | 50 | 53 | 2.0 |
| 14-6 | Sodium dodecyl sulfate | 20 | 53 | 2.0 |
| 27-6 | Repel-O-TEX SF2 | 20 | 53 | 2.0 |
| 18-3 | Sodium dodecyl sulfate | 10 | 50 | 1.9 |
| 14-4 | Sodium dodecyl sulfate | 20 | 48 | 1.9 |
| 21-5 | Magnesium | 20 | 47 | 1.8 |
| 41-4 | Rhodacal 330 | 50 | 46 | 1.8 |
| 18-4 | Sodium dodecyl sulfate | 50 | 45 | 1.7 |
| 28-3 | Rhodasurf ON/870-E | 20 | 44 | 1.7 |
| 32-3 | Igepal CA 630 | 20 | 43 | 1.7 |
| 18-6 | Sodium dodecyl sulfate | 50 | 43 | 1.7 |
| 34-3 | Antarox L-62 | 20 | 42 | 1.6 |
| 27-3 | Jaguar HP 105 | 20 | 42 | 1.6 |
| 37-6 | Rhodacal 330 | 20 | 42 | 1.6 |

The following table (Table 7) only gives the additives for which the oversize at 250 μm is greater than the average oversize at 250 μm+3 standard deviations (30 wt %) of the sodium bicarbonates of the reference tests without additive. Moreover, the ratio F add/F ref is the ratio of the oversize fraction by weight at 250 μm of sodium bicarbonate crystallized in the presence of additive divided by the average oversize fraction by weight at 250 μm of sodium bicarbonate crystallized without additive (i.e. 15 wt %):

TABLE 7.a

Results of the tests with additives - Oversize on vibratory sieve for particle powders.

| Test | Additive | [Additive] mg/kg | F > 250 μm wt % | F add/ F ref |
|---|---|---|---|---|
| 19-4 | HMP | 20 | 68 | 4.5 |
| 42-4 | HMP | 20 | 63 | 4.2 |
| 40-1 | HMP | 20 | 62 | 4.1 |
| 42-1 | HMP | 20 | 58 | 3.9 |
| 19-2 | Sodium polyacrylate | 20 | 58 | 3.8 |
| 19-5 | Sodium polyacrylate | 20 | 56 | 3.7 |
| 42-6 | HMP | 20 | 54 | 3.6 |
| 42-5 | HMP | 20 | 53 | 3.6 |
| 15-5 | Hexamethylene-diamine | 20 | 53 | 3.5 |
| 40-2 | HMP | 20 | 53 | 3.5 |
| 42-3 | HMP | 20 | 52 | 3.5 |
| 19-6 | HMP | 20 | 51 | 3.4 |
| 15-avr | Polyvinylsulfonic acid | 20 | 51 | 3.4 |
| 40-3 | HMP | 20 | 47 | 3.2 |

The following table (Table 7.b) gives the specific results obtained with sodium polyacrylates of different average molecular weights between 1800 and 1 250 000 g/mol and with various amounts added: 10, 20, 30, 50 ppm.

TABLE 7.b

Results of the tests with additives of the sodium polyacrylate type with different average molecular weights - Oversize on vibratory sieve for particle powders (F > 250 μm in wt %). F > 250 μm (wt %) - Function of the molecular weight of sodium polyacrylate and of the amount of additive added

| Average molecular weight Na Polyacrylate (g/mol) | 10 ppm | 20 ppm | 30 ppm | 50 ppm |
|---|---|---|---|---|
| 1800 | 7 | 3 | 7 | 9 |
| 2100 | 4 | 2 | | 3 |
| 8000 | 9 | 43 | 60 | 75 |
| 14800 | 27 | 52 | 64 | 71 |
| 1250000 | 33 | 33 | 58 | 72 |

The following table (Table 8) only gives the additives for which the fraction of particles between 125 and 250 μm is greater than the mean fraction 125-250 μm+3 standard deviations of the reference tests without additive (i.e. 68 wt %). Moreover, the ratio F add/F ref is the ratio of the 125-250 μm fraction by weight of sodium bicarbonate crystallized in the presence of additive divided by the average 125-250 μm fraction by weight of sodium bicarbonate crystallized without additive (i.e. 59 wt %):

TABLE 8

Results of the tests with additives - Oversize on vibratory sieve for particle powders.

| Test | Additive | [Additive] mg/kg | 125 < F < 250 μm wt % | F add/ F ref |
|---|---|---|---|---|
| 18-5 | Polyvinylsulfonic acid | 50 | 76 | 1.3 |
| 21-4 | Polyvinylsulfonic acid | 50 | 72 | 1.2 |
| 18-2 | Polyvinylsulfonic acid | 50 | 70 | 1.2 |

Remarks:
For 10 ppm of additive (ppm=mg active substance/kg initial liquid):
 Production of fines with the following additives:
  Sodium dodecyl sulfate
For 20 ppm of additive (ppm=mg active substance/kg initial liquid):
 Production of fines (F<125 μm) with the following additives:
  Lubrophos LB/400-E
  Rhodacal 330
  Rhodafac RM 510
  Sodium dodecyl sulfate
  Repel-O-TEX SF2
  Magnesium
  Rhodasurf ON/870-E
  Igepal CA 630
  Antarox L-62
  Jaguar HP105
 Production of coarse particles (F>250 μm) with the following additives:
  Sodium hexametaphosphate
  Sodium polyacrylate
  Hexamethylenediamine
  Polyvinylsulfonic acid
 For sodium polyacrylate, it can be seen from Table 7.b that for the production of coarse particles there is a limiting average molecular weight for the homopolymers of polyacrylic acid. It is found in fact that starting from 8000 g/mol, the granulometric fraction above 250 μm (F>250 μm) is almost constant at the concentrations of additive tested.
For 50 ppm of additive (ppm=mg active substance/kg initial liquid):
 Production of fines (F<125 μm) with the following additives:
  Rhodacal 330
  Lubrophos LB/400-E
  Sodium dodecyl sulfate
 Production of a Bicar with reduced granulometric spread:
  Polyvinylsulfonic acid
For 20 ppm of additive (ppm=mg active substance/kg initial liquid): it can be seen that the organophosphates such as:
 Lubrophos LB/400-E
 Rhodafac RM 510
significantly increase the number of fines passing through the 125 μm sieve.

Example 3—Crystallization of Sodium Bicarbonate Particles by Carbonation

The present example illustrates continuous carbonation for manufacture of sodium bicarbonate with and without additives.

Operating Conditions:

The preparation of sodium bicarbonate particles by crystallization by carbonation is carried out in a closed precipitation reactor with useful capacity of 5 liters, stirred at 800 (referenced 'a') or 1070 revolutions per minute (referenced 'b'). A feed solution containing 100 grams of sodium bicarbonate per kilogram of aqueous solution and 130 grams of sodium carbonate per kilogram of aqueous solution is injected continuously at the center of the stirred reactor at a flow rate of 3.3 liters per hour. Carbon dioxide is injected into the reactor at a flow rate of 750 normal liters per hour via a perforated pipe placed at the bottom of the reactor under the stirrer. The suspension formed from sodium bicarbonate particles is withdrawn continuously at the bottom of the reactor at a flow rate of 3.3 liters per hour in order to maintain a constant level in the reactor. The reactor for crystallization by carbonation is placed under relative pressure of the gas cover 200 to 600 mbar relative.

The additive is prepared as a solution of 1 wt % of active substance in water in such a way that the amounts of additive are expressed here as weight of active substance per weight of solution to be crystallized. The solution of additive is injected into the center of the stirred suspension.

For the sodium polyacrylate, the average molecular weight of the additive used was 5100 g/mol (below 8000 g/mol).

After establishment of continuous conditions, a portion of the suspension of crystals is recovered and is filtered on a Büchner filter and filter paper. The filtered solution comprises about 125 grams of sodium bicarbonate per kilogram of aqueous solution and 65 grams of sodium carbonate per kilogram of aqueous solution. The sodium bicarbonate particles obtained on the Büchner are washed with 250 ml of ethanol and then dried in the same way as in example 1. The powder of particles thus obtained is characterized. The following measurements are performed:

- Undersize (passing through) on a sieve at 125 µm: (wt %)
- Oversize (retained) on a sieve at 250 µm: (wt %)
- Laser granulometry (D10, D50, D90 and span) (µm)
- Bulk density (BD) (kg/m$^3$ or g/L)
- Dissolution time(s)
- Angle of repose (°)
- Flow test (tube number in the 'Degussa' test)
- Abrasion index (AI in %).

Procedure for Measurement of the Dissolution Time:

The dissolution time (comparative between the different samples) is measured with a conductometric cell immersed in a stirred beaker with 1 liter of demineralized water maintained at 25° C. (±1° C.) Stirring is carried out with a marine propeller at 350 revolutions per minute. 10 grams of sodium bicarbonate particles are introduced into the solution, where they dissolve and cause an increase in conductivity of the solution. The dissolution time corresponds to the time taken to reach 95% of the final value of the conductivity in solution.

Procedure for Measurement of the Angle of Repose:

The Angle of repose of the powders obtained is measured after formation of a poured cone that the powder forms on falling from a sieve of size 710 µm onto a cylinder with diameter of 50 mm and height of 80 mm. The height of the sieve relative to the top of the cone must be maintained between 2 and 3 cm. The Angle of repose AR (°) is calculated from measurement of the height H (mm) of the heap of powder remaining on the cone:

$$[AR]=\tan^{-1}(H/28)*(180/\pi)$$

Procedure for Measurement of Flowability by the Flow Test:

Measurement of flowability consists of determining the flow of a sample of powder contained in a conical container, through an orifice of calibrated diameter. Seven cones, with height of 125 mm and diameter of 43.5 mm at the top have an orifice with increasing flow diameter: 2.4 mm (tube 1), 4.9 mm (tube 2), 8.0 (tube 3), 9.8 mm (tube 4), 12.3 (tube 5), 15.2 (tube 6) and 18.1 mm (tube 7). The test can determine the minimum opening (tube 1 to 7) starting from which the product can flow.

Procedure for Measurement of the Duration of the Abrasion Index:

The abrasion index at 63 µm consists of the difference of the relative measurement of weight of powder below 63 µm before and after abrasive wear. The wear test consists of passing 100 grams of powder through a rotating drum made of stainless steel with an inside diameter of 150 mm, internal length of 22 cm, and equipped with 3 blades with width of 35 mm. The drum rotates at 40 revolutions per minute for 20 minutes.

Remarks:

The following tables (Table 9.a and 9.b) present the results obtained: The tests with additives referenced (a) carried out at a stirring speed of 800 rev/min or referenced (b) carried out at 1070 rev/min must be compared with the respective reference tests without additive:

test 1(a) at 800 rev/min test 2(b) at 1070 rev/min.

Moreover, measurement of the specific surface areas (BET surface areas) on the sodium bicarbonate particles obtained in the tests without additives: 1(a) and 1(b) and test 6(a) (sodium polyacrylate at 500 ppm) gives the following values:

test 1(a) and test 2(b) (without additive): BET between 0.05 and 0.15 m$^2$/g, test 6(a) (sodium polyacrylate at 500 ppm): 1.4 m$^2$/g.

It should be pointed out that notably in carbonation:

Polyacrylate (average molecular weight: 5100 g/mol) added at 5, 10, 50 and 500 ppm, and sodium hexametaphosphate at 50 ppm lower the granulometry of the bicarbonate particles and the BD. The angles of repose are increased. The dissolution times are decreased unless there is a large addition of polyacrylate at 500 ppm—Test 6(a) where the dissolution time is increased.

Phosphates: sodium hexametaphosphate at 50 ppm lowers the granulometry of the bicarbonate particles and the BD.

Sodium sulfate at 500 ppm increases the granulometry of the particles and increases the BD.

Polysaccharides such as alginic acid at 10, 20 and 50 ppm and carboxymethylcellulose at 20 ppm (tests 9 to 12) increase the granulometry of the particles, reduce the span, generally increase the BD, and increase the dissolution time. The abrasion index is improved with a decrease in fines <63 µm generated during the wear test. Photographs of the sodium bicarbonate particles, taken with the light microscope, indicate a more compact, parallelepipedal shape in the presence of polysaccharides whereas the bicarbonate particles without additive are of a more elongated, needle-like shape.

Betaine (quaternary amine) at 10, 20 and 50 ppm increases the granulometry of the sodium bicarbonate particles, reduces the span, increases the dissolution time, and increases the abrasion index.

In the case when disclosure of the patents, of the patent applications and of publications that are incorporated here by reference would generate a conflict in the understanding of a term making it unclear, the present descriptive specification takes precedence.

TABLE 9.a

Example 3 - Results of the carbonation tests

| Test | Additive | Additive (mg/kg) | Stirring speed (rev/min) | Fraction < 125 μm (% w/w) | Fraction > 250 μm (% w/w) | D10 (μm) | D50 (μm) | D90 (μm) | SPAN |
|---|---|---|---|---|---|---|---|---|---|
| 1(a) | No additive (Ref. a) | — | 800 | 7 | 63 | 138 | 290 | 504 | 1.26 |
| 2(b) | No additive (Ref. b) | — | 1070 | 24 | 33 | 75 | 197 | 329 | 1.29 |
| 3(a) | Sodium polyacrylate | 5 | 800 | 12 | 62 | 114 | 301 | 357 | 1.50 |
| 4(a) | Sodium polyacrylate | 10 | 800 | 23 | 47 | 70 | 237 | 433 | 1.53 |
| 5(a) | Sodium polyacrylate | 50 | 800 | 18 | 54 | 5 | 35 | 129 | 3.52 |
| 6(a) | Sodium polyacrylate | 500 | 800 | 18 | 64 | 3 | 43 | 563 | 12.93 |
| 7(a) | Sodium hexametaphosphate | 50 | 800 | 17 | 63 | 9 | 53 | 133 | 2.36 |
| 8(b) | Sodium sulfate | 500 | 1070 | 13 | 33 | 113 | 207 | 320 | 1.00 |
| 9(b) | Alginic acid | 10 | 1070 | 13 | 41 | 111 | 224 | 339 | 1.02 |
| 10(a) | Alginic acid | 20 | 800 | 8 | 62 | 131 | 283 | 464 | 1.18 |
| 11(b) | Alginic acid | 50 | 1070 | 10 | 33 | 126 | 215 | 328 | 0.94 |
| 12(a) | Carboxymethylcellulose | 20 | 800 | 5 | 76 | 159 | 350 | 564 | 1.16 |
| 13(b) | Soybean lecithin | 20 | 1070 | 22 | 7 | 90 | 180 | 246 | 0.86 |
| 14(b) | Betaine | 10 | 1070 | 8 | 67 | 137 | 300 | 477 | 1.13 |
| 15(b) | Betaine | 20 | 1070 | 10 | 39 | 124 | 227 | 309 | 0.82 |
| 16(b) | Betaine | 50 | 1070 | 7 | 60 | 137 | 274 | 416 | 1.02 |

(F < 125 μm, F > 250 μm, D10, D50, D90, and span of the sodium bicarbonate particles obtained)

TABLE 9.b

Example 3 - Results of the carbonation tests (continued)

| Test | Additive | Additive (mg/kg) | Stirring speed (rev/min) | BD (kg/m$^3$) | Dissolution time (s) | Angle of repose (°) | Flowability Flow (tube No.) | Abrasion index at 63 μm (%) |
|---|---|---|---|---|---|---|---|---|
| 1(a) | No additive (Ref. a) | — | 800 | 908 | 33 | 34 | 2 | 0.13 |
| 2(b) | No additive (Ref. b) | — | 1070 | 732 | 22 | 41 | 2 | 0.95 |
| 3(a) | Sodium polyacrylate | 5 | 800 | 796 | 35 | 40 | 2 | 1.45 |
| 4(a) | Sodium polyacrylate | 10 | 800 | 511 | 19 | 41 | 5 | 1.68 |
| 5(a) | Sodium polyacrylate | 50 | 800 | 324 | 17 | 63 | 8 | 0.97 |
| 6(a) | Sodium polyacrylate | 500 | 800 | 415 | 43 | 57 | — | — |
| 7(a) | Sodium hexametaphosphate | 50 | 800 | 337 | 14 | 65 | — | 2.05 |
| 8(b) | Sulfate sodium | 500 | 1070 | 851 | 26 | 37 | 1 | 0.76 |
| 9(b) | Alginic acid | 10 | 1070 | 961 | 31 | 37 | 1 | 0.91 |
| 10(a) | Alginic acid | 20 | 800 | 724 | 34 | 39 | 2 | — |
| 11(b) | Alginic acid | 50 | 1070 | 990 | 30 | 36 | 1 | 0.51 |
| 12(a) | Carboxymethylcellulose | 20 | 800 | 585 | 36 | 41 | 3 | — |
| 13(b) | Soybean lecithin | 20 | 1070 | 871 | 26 | 39 | 1 | 0.75 |
| 14(b) | Betaine | 10 | 1070 | 717 | 28 | 39 | 2 | 1.47 |
| 15(b) | Betaine | 20 | 1070 | 773 | 25 | 39 | 1 | 0.96 |
| 16(b) | Betaine | 50 | 1070 | 736 | 26 | 39 | 2 | 1.03 |

(BD, Dissolution time, Angle of repose, Flowability of flow, Abrasion index)

The invention claimed is:

1. A method for preparing, by crystallization, alkali metal bicarbonate particles starting from a solution of alkali metal carbonate and/or bicarbonate in the presence of an additive in the solution,
wherein the additive is an amine selected from the group consisting of hexamethylenediamine, hydroxysultaines, and quaternary amines comprising at least one carboxylic acid group, and wherein the additive is present in the solution at a concentration of at least 1 ppm.

2. The method as claimed in claim 1, wherein the additive is present at a concentration of at most 200 ppm.

3. The method as claimed in claim 1, wherein crystallization of the alkali metal bicarbonate particles is carried out by cooling the solution.

4. The method as claimed in claim 3, wherein cooling of the solution is carried out between 70° and 30° C.

5. The method as claimed in claim 1, wherein crystallization of the alkali metal bicarbonate particles is carried out by carbonation of the solution with carbon dioxide.

6. The method as claimed in claim 5, wherein carbonation of the solution is carried out at a temperature of at least 20° C.

7. The method as claimed in claim 5, wherein carbonation of the solution with carbon dioxide is carried out with a gas comprising: 10 to 100% of CO2 by volume based on dry gas.

8. The method as claimed in claim 1, wherein crystallization of the alkali metal bicarbonate particles is carried out by evaporation of at least a proportion of the solution.

9. The method as claimed in claim 1, wherein crystallization of the alkali metal bicarbonate particles is carried out by concomitant cooling and carbonation of the solution; or by concomitant cooling and carbonation and evaporation of the solution.

10. The method as claimed in claim 1, being carried out at a temperature between 20° C. and 95° C.

11. The method as claimed in claim 1, wherein addition of the additive to the solution is carried out for controlling or modifying:

the granulometry, or the undersize or oversize on a sieve at 125 µm, or the undersize or oversize on a sieve at 250 µm, of the alkali metal bicarbonate particles obtained after separation of the crystallization solution and of the alkali bicarbonate particles.

12. The method as claimed in claim 11, being carried out for controlling the size of the alkali bicarbonate particles to control the sieve undersize at 125 µm or the sieve oversize at 250 µm of the alkali bicarbonate particles.

13. The method as claimed in claim 1, wherein addition of the additive to the solution is carried out for controlling or modifying:

the dissolution time, or the bulk density (BD), or the flow rate in a calibrated orifice, or the abrasion index, of the alkali metal bicarbonate particles obtained after separation of the crystallization solution and of the alkali bicarbonate particles, then drying of the alkali metal bicarbonate particles.

14. The method as claimed in claim 13, wherein addition of the additive to the solution makes it possible to reduce the BD of the alkali metal bicarbonate particles by at least 10% relative to the BD of alkali metal bicarbonate particles obtained in the same conditions of crystallization but without addition of the additive.

15. The method as claimed in claim 13, wherein addition of the additive to the solution makes it possible to increase the BD of the alkali metal bicarbonate particles by at least 10% relative to the BD of alkali metal bicarbonate particles obtained in the same conditions of crystallization but without addition of the additive.

16. Alkali metal bicarbonate particles obtainable by the method as claimed in claim 1 and comprising at least 10 ppm of the additive.

17. The method as claimed in claim 1, wherein the additive is selected from the group consisting of quaternary amines comprising at least one carboxylic acid group.

18. The method as claimed in claim 1, wherein the additive is selected from the group consisting of:

quaternary amines comprising at least one carboxylic acid group and being of formula:

and $n=1$ to 4.

19. The method as claimed in claim 18, wherein the additive is trimethylglycine.

20. The method as claimed in claim 1, wherein the additive is hexamethylenediamine.

21. The method as claimed in claim 1, wherein the additive is a hydroxysultaine.

* * * * *